United States Patent [19]
Coburn et al.

[11] 3,723,748
[45] Mar. 27, 1973

[54] DIGITAL TACHOMETER WITH SYMMETRICAL OUTPUT

[75] Inventors: Ronald L. Coburn; Oyvind Roth, both of Boulder, Colo.

[73] Assignee: International Business Machines Corporation, Armonk, N.Y.

[22] Filed: June 23, 1971

[21] Appl. No.: 155,977

[52] U.S. Cl.................250/233, 324/175, 250/237 G
[51] Int. Cl................................................G01d 5/36
[58] Field of Search..250/233, 231, 231 SE, 219 DD, 250/237 G, 209; 356/152, 27, 28; 324/175

[56] References Cited

UNITED STATES PATENTS

| | | | |
|---|---|---|---|
| 3,388,262 | 6/1968 | Stutz | 356/152 X |
| 3,449,588 | 6/1969 | Foskett | 250/231 SE |
| 3,454,777 | 7/1969 | Marcus | 250/231 SE |
| 3,591,841 | 7/1971 | Heitmann | 250/231 R |
| 3,394,264 | 7/1968 | Busey | 250/233 |
| 3,447,089 | 5/1969 | Foley | 250/233 X |

*Primary Examiner*—Walter Stolwein
*Attorney*—Francis A. Sirr et al.

[57] ABSTRACT

A two-phase optical tachometer whose two stationary masks and one movable mask are constructed to provide approximately a 3-to-1 dark-to-light ratio. The two masks, and two associated photocells, are oriented relative to the movable mask to provide two signals which are 90° out of phase. The electrical output signal of each photocell is cyclic in nature, and each cycle thereof provides an active triangular output waveform interval, corresponding to the presence of light, which is slightly larger than one-half of the total cycle time. Each of these electrical output signals is connected to the input of an amplifier whose sensitivity threshold is adjusted to a low value, and to a value which produces a cyclic square-wave output. Each square-wave cycle of the amplifier output is symmetrical; that is, each cycle includes an active output interval, corresponding to the presence of light, which is equal to one-half of the total cycle time. The frequency of the two signals provides distance and/or velocity information. The phase relationship of the two signals provides direction information.

8 Claims, 4 Drawing Figures

PATENTED MAR 27 1973

DIGITAL TACHOMETER WITH SYMMETRICAL OUTPUT

BACKGROUND AND SUMMARY OF THE INVENTION

This invention relates to the field of electrical measuring devices of the type having speed related frequency generators, and particularly those which utilize radiant energy detectors.

Optical tachometers, also referred to as digital tachometers and incremental encoders, are a class of distance measuring device which provides an output pulse for each increment of movement. The number of pulses counted per unit time is a measure of the speed or velocity of the tachometer moving member. The total number of pulses counted is a measure of the distance traveled. Directional encoders of this type are constructed to provide at least two phase-spaced signals whose phase relationship indicates direction of movement.

Two-phase directional encoders are known which are constructed with a dark-to-light ratio equal to approximately 1–1, and thus produce two essentially triangular output waveforms from the two photocells. In order to obtain a symmetrically square-wave output from the associated amplifier, the amplifier threshold of these prior art devices is adjusted to be approximately one-half of the peak value of the triangular waveform. These prior art devices are, therefore, quite sensitive to deterioration in the amplitude of the triangular waveform, and in fact the amplifier output goes to zero if the waveform amplitude decreases 50 percent. However, prior to losing the signal entirely, the phase relationship of the two signals is disturbed and direction information may be lost.

The present invention provides a unique relationship between the above-mentioned dark-to-light ratio and the amplifier threshold to provide a directional encoder whose output symmetry and phase relationship change very little with the usual changes in waveform amplitude.

Specifically, the encoder of the present invention produces a radiant energy waveform having a dark-to-light ratio in the range of 3–1, preferably in the range of 2.8–3.0–1. The resulting photocell output is a cyclic waveform, one cycle of which includes an essentially triangular-shaped pulse occupying slightly more than one-half of the cycle time, followed by an absence of signal for the remainder of the cycle. This photocell output is connected to the input of an amplifier, and the amplifier sensitivity threshold is adjusted to a low value, and to a value to produce a symmetrical square wave at the amplifier output.

The foregoing and other features and advantages of the invention will be apparent from the following more particular description of the preferred embodiment of the invention, as illustrated in the accompanying drawings.

DESCRIPTION OF THE PREFERRED EMBODIMENTS

Figure 1:
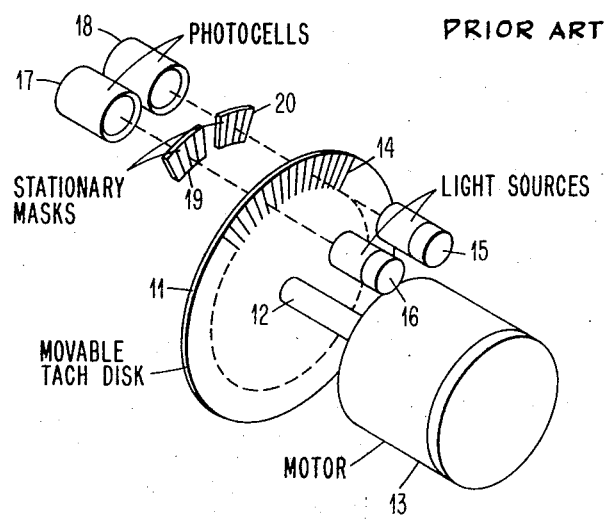
FIG. 1 is a diagrammatic showing of a prior art two-phase optical incremental tachometer.

FIG. 1 is a diagrammatic showing of a two-phase optical incremental tachometer of the type known to those of ordinary skill in the art. A description of this tachometer will facilitate the understanding of the present invention. In this tachometer, a low inertia movable tachometer disc 11 is supported by the shaft 12 of a bidirectional motor 13. Preferably, disc 11 is a thin, light-transparent member on which a large number of opaque lines 14 are placed, the lines 14 being equally spaced about 360° circumference of the disc. Tachometers of this general type may be either of the reflective or see-through type. FIG. 1 discloses the see-through type wherein two light sources 15 and 16 are positioned on one side of the disc and two photocells 17 and 18 are positioned in alignment therewith on the other side of the disc. The light sources and photocells are stationary and the photocells view the chopped light through two aligned stationary masks 19 and 20. As is well known to those of ordinary skill in the art to which the present invention pertains, the light sources, photocells and masks are mechanically oriented relative to the spacing of the opaque lines 14 carried by disc 11 such that the two cyclic waveforms derived from the two photocells 17 and 18 are 90° out of phase. With this condition existing, the phase relationship in these two waveforms is an indication of the direction of movement of disc 11 and motor 13. While the environment of the present invention has been established by means of a typical prior art optical tachometer as shown in FIG. 1, the teachings of the present invention are not limited to the specific structure shown therein.

Figure 2:
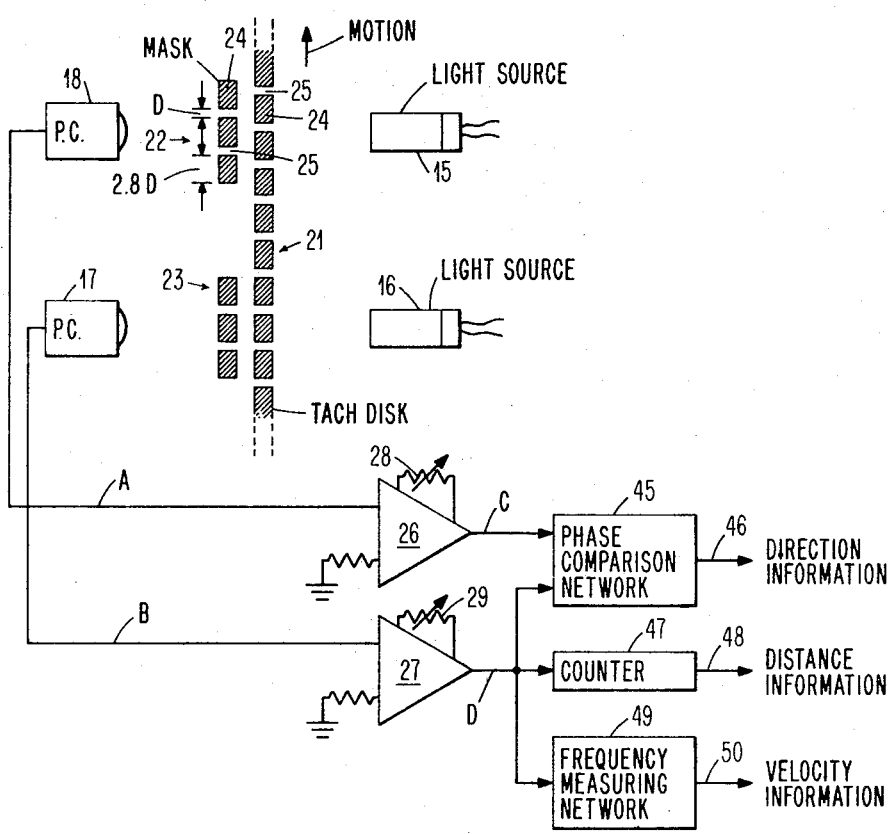
FIG. 2 shows a form that the present invention may take when applied to the tachometer of FIG. 1, and shows the critical relationship of the dark-to-light ratio of the movable element and of the stationary masks, along with two photocells and their amplifiers.

FIG. 2 discloses the present invention as applied to the type of tachometer shown in FIG. 1, and more particularly discloses the critical relationship of the dark-to-light ratio of the movable element and the stationary masks.

In FIG. 2 the light sources and the photocells are again identified by reference numerals 15–18. The movable element, which may be generally similar to the disc 11 of FIG. 1, is identified by reference numeral 21, whereas the two stationary masks are identified generally by reference numerals 22 and 23.

From the dimensions disclosed in FIG. 2, it can be seen that the critical dark-to-light ratio of both movable element 21 and masks 22 and 23 is in the ratio of 2.8–1 (2.8D–D). As the movable mask rotates, each of the opaque segments 24 of the mask covers a transparent portion 25 in one of the masks for a time which is determined not only by the speed of movement of member 21, but also by the relative dimension (2.8D and D) of the portions 24 and 25. Within the teachings of the present invention, the relationship of the dimensions of portions 24 and 25, measured in the direction of relative movement, is a ratio in the range of 3–1. In the preferred embodiment disclosed in FIG. 2, this ratio is in fact 2.8–1.

Figure 3:
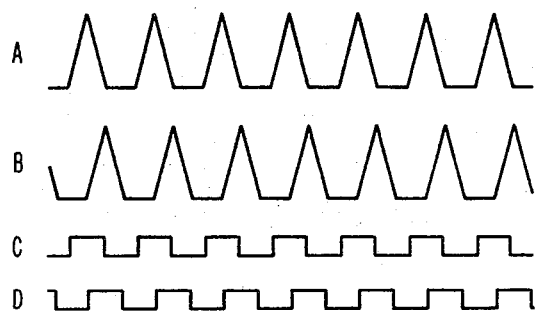
FIG. 3 is a graphical showing of the wave forms generated at the four conductors, A, B, C and D of the circuit of FIG. 2, when the movable element moves from left to right.

The electrical output waveform from photocells 17 and 18, on conductors B and A, respectively, is shown in FIG. 3. It can be seen that this waveform is essentially triangular. The triangle portion of the waveform can be designated as the active portion, since this triangle corresponds to the transmission of light through the channel formed by transparent portions 25 as these transparent portions pass in relative alignment. As the transparent portion 25 of movable member 21 is beginning to uncover the like-numbered transparent portion of one of the masks, the triangle is on the steeply rising leading edge of its waveform. As the transparent portion of the movable member and the mask are in exact alignment, as shown in FIG. 2, the triangle waveform is at a maximum value. As the mask moves on, to again cover the transparent portion of the mask with an opaque portion 24 of the movable member, the triangular waveform falls to a low steady-state level, which can be called the inactive portion of the waveform. As can be seen from FIG. 3, the ratio 2.8–1 provides an active triangular waveform whose base portion is slightly longer than the inactive portion of the waveform. Also, as can be seen in FIG. 3, the physical circumferentially displacement of masks 22 and 23 causes the waveforms A and B to be 90° out of phase.

A further critical feature of the present invention is the construction and arrangement of amplifiers 26 and 27, FIG. 2, and particularly the adjustment of the threshold of sensitivity thereof, for example by means of potentiometers 28 and 29. Amplifiers 26 and 27 are constructed and arranged such that the output waveforms on conductors C and D, respectively, are symmetrical square-wave outputs as shown by waveforms C and D of FIG. 3.

Figure 4:
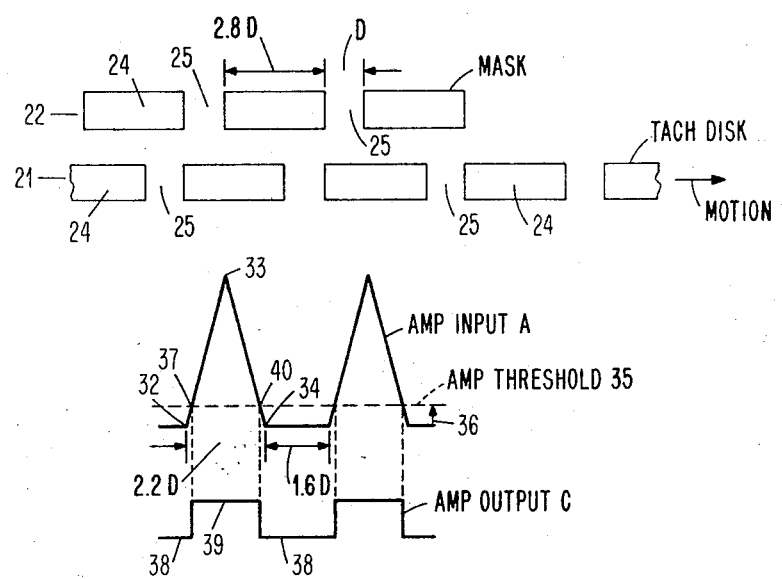
FIG. 4 is a further graphical showing which is helpful in understanding the critical relationship of the dark-to-light ratio and the amplifier threshold.

Referring to FIG. 4, this figure associates a portion of tachometer disc 21 and mask 22 with the waveforms A and C generated by movement of disc 21. The right-hand edge of disc opening 25 is shown in alignment with the left-hand edge of mask opening 25. This position corresponds to the point 32 on waveform A. As disc 21 continues to move to the right, the triangular waveform increases in amplitude until such time as the right-hand edge of the two openings 25 are in alignment. This position corresponds to the point 33 on waveform A. As the disc continues to move to the right, the amplitude of the triangular waveform decreases until such time as the left-hand edge of disc opening 25 is in alignment with the right-hand edge of mask opening 25, at which time waveform A is at the point designated by reference numeral 34.

As can be seen clearly in FIG. 4, the alternate half-cycle times of waveform A are not equal. However, amplifier 26, FIG. 2, is constructed and arranged with an input amplitude threshold on sensitivity represented by broken line 35 and by the amplitude vector 36. Thus, amplifier 26 remains insensitive to waveform A until the amplitude of the waveform has increased to the value represented by numeral 37. At this time, waveform C abruptly increases from an inactive level 38 to an active level 39. Waveform C remains at this active level until such time as the amplitude of the triangular waveform drops to a value represented by numeral 40, recognizing that values 37 and 40 may not in fact be at the same level, as shown, due to the operating differential of the amplifier. At this time, amplifier 26 assumes an inactive state and waveform C again drops to the inactive level 38.

A new and unusual result achieved by the structure of the present invention is readily apparent from FIG. 4. As will be appreciated by those of ordinary skill in the art, the amplitude of waveform A is dependent upon various physical parameters, for example the light intensity of light source 15. This intensity will vary as parameters such as the light source supply voltage vary. As the amplitude of waveform A varies, within the range normally to be expected, relatively little lateral shifting is experienced in the amplifier threshold points 37 and 40. An extreme variation in amplitude of waveform A will shorten the active portion 39 and lengthen the inactive portion 38 of waveform C. However, pulse information is always available in waveform C, until such time as the amplitude of waveform A greatly reduces to below the amplifier threshold amplitude, such an occurrence being extremely unlikely.

Phase comparison network 45 compares the phase relationship of the two waveforms of conductors C and D and provides an output on conductor 46 which indicates the direction of movement of member 21. Counter 47 counts the cycles of the waveform on conductor D and provides an output on conductor 48 which indicates the total distance traveled by member 21. Frequency measuring network 49 counts the cycles of the waveform on conductor D which occur per unit time and provides an output on conductor 50 which indicates the velocity of member 21.

While the invention has been particularly shown and described with reference to a preferred embodiment thereof, it will be understood by those skilled in the art that various changes in form and details may be made therein without departing from the spirit and scope of the invention.

What is claimed is:

1. An incremental encoder comprising:
    a stationary source of radiant energy,
    a relatively movable element associated with said source and having a plurality of energy transparent regions separated by energy opaque regions, the physical dimensions of said regions being select to alternately block and then allow transmission of radiant energy in the ratio of approximately 3–1,
    a stationary detector of radiant energy associated with said relatively movable element to intercept the transmission of radiant energy thereby and to produce an electrical output signal having a pulse-shaped active portion corresponding to the presence of radiant energy and a substantially steady-state inactive portion corresponding to the absence of radiant energy, said active portion being of longer duration than said inactive portion, and
    signal processing means having an input connected to said detector and constructed and arranged to have a sensitivity threshold level which is above said steady-state value and is of a value such that a symmetrical output is produced by said signal processing means.

2. An incremental encoder as defined in claim 1 including a stationary mask associated with said detector, said mask having a plurality of energy transparent regions separated by energy opaque regions, said regions being in the same dimensional relationship as the like named region of said movable element.

3. An incremental encoder as defined in claim 2 wherein said ratio is 2.8–1.

4. A multiphase incremental encoder comprising:
a stationary source of radiant energy,
a bidirectional relatively movable element associated with said source and having a plurality of energy transparent regions of a given dimension measured in the direction of movement of said element, said energy transparent regions being separated by energy opaque regions which are of approximately three times said given dimension measured in said direction of movement,
a plurality of stationary radiant energy detector means associated with said relatively movable element to intercept the transmission of radiant energy thereby and to produce a plurality of electrical output signals as a result thereof, each of said output signals having a pulse-shaped active portion corresponding to the presence of radiant energy and a substantially steady-state inactive portion corresponding to the absence of radiant energy, said active portion being of longer duration than said inactive portion, and said detector means being spaced from each other in said direction of movement to produce phase-displaced signals therefrom, and
a plurality of signal processing means, each having an input connected to one of said detector means and each being constructed and arranged to have a selected sensitivity threshold level which is above said steady-state value and is of a value such that a symmetrical output is produced by each of said signal processing means.

5. A multiphase incremental encoder as defined in claim 4 wherein each of said detector means includes a stationary mask having energy transparent regions and energy opaque regions in the same spacial relationship as the like named region of said movable element, said masks being spaced from each other in said direction of movement and being in alignment with its associated detector means.

6. A multiphase incremental encoder as defined in claim 5 including means responsive to the output of said plurality of signal processing means and effective to provide an output indicating the direction of movement of said movable element.

7. A multiphase incremental encoder as defined in claim 6 including means responsive to the output of at least one of said plurality of signal processing means and effective to provide an output which varies as a function of the distance through which said element moves.

8. A multiphase incremental encoder as defined in claim 5 wherein said source of radiant energy provides energy in the visible spectrum, wherein said element is a low inertia rotary disc, wherein said detectors are photoelectric cells responsive to the visible spectrum, and wherein said signal processing means are amplifiers having adjustment means effective to adjust the sensitivity threshold thereof.

* * * * *